United States Patent
Fettig et al.

(10) Patent No.: US 6,513,939 B1
(45) Date of Patent: Feb. 4, 2003

(54) MICRO-MIRRORS WITH VARIABLE FOCAL LENGTH, AND OPTICAL COMPONENTS COMPRISING MICRO-MIRRORS

(75) Inventors: Heiko M. Fettig, Ottawa (CA); James Wylde, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 10/098,446

(22) Filed: Mar. 18, 2002

(51) Int. Cl.[7] ................................................ G02B 1/03
(52) U.S. Cl. .................... 359/847; 359/848; 359/849; 359/290; 359/291
(58) Field of Search ................................ 359/847, 848, 359/849, 850, 869, 883, 884, 265, 267, 198, 199, 201, 202, 203, 290, 291, 247, 254, 295, 298, 296

(56) References Cited

U.S. PATENT DOCUMENTS

| | | | |
|---|---|---|---|
| 4,566,935 A | * | 1/1986 | Hornbeck ...................... 216/2 |
| 4,573,768 A | * | 3/1986 | Polak et al. ................. 359/270 |
| 5,629,790 A | * | 5/1997 | Neukermans et al. ....... 250/234 |
| 6,091,197 A | * | 7/2000 | Sun et al. ...................... 257/98 |
| 6,178,033 B1 | * | 1/2001 | Ford et al. ................... 359/247 |
| 6,278,541 B1 | * | 8/2001 | Baker .......................... 359/291 |

OTHER PUBLICATIONS

Rashidian et al., "Electrothermal Microactuators Based On Dielectric Loss Heating", Proceedings of IEEE MEMS micro Electro Mechanical System), pp. 24–29, Feb. 1993.
M. Little, "MEMS: More Than Merely Micromirrors", Fiberoptic Product News, Feb. 2002.

* cited by examiner

*Primary Examiner*—Mohammad Sikder (57) ABSTRACT

A micro-mirror comprises a membrane of a dielectric polymer layer between two metal layers for supplying a high frequency ac voltage thereto for dielectric heating of the membrane, and a further polymer layer adjacent to and forming a bimorph with the second metal layer, the membrane being supported around its periphery so that the membrane produces a mirror with a curvature, and hence a focal length, dependent upon the heating. Such micro-mirrors are useful in optical signal paths in optical components, including optical receivers and variable attenuators. A detected optical signal can be used in a feedback control path to control a high frequency ac voltage source connected to the two metal layers, and hence the focal length of the micro-mirror.

18 Claims, 5 Drawing Sheets

MICRO-MIRRORS WITH VARIABLE FOCAL LENGTH, AND OPTICAL COMPONENTS COMPRISING MICRO-MIRRORS

This invention relates to micro-mirrors, and is particularly concerned with micro-mirrors having variable focal length and useful in optical components. The term "micro-mirror" is used herein to mean a mirror of relatively small size, typically having a lateral dimension of the order of 1 or 2 mm or less.

BACKGROUND

Optical components, for example for use in optical communications systems, typically couple an optical signal from an optical source to an optical sink; each of the optical source and sink can be an optical device such as an optical signal transmitter or detector, or an optical fiber or other optical path. It is desirable to perform such coupling with a minimal or, in the case of an optical attenuator, a controlled optical signal loss, which typically requires a matching between the sizes of the optical signal beam and the optical source and sink. Such matching can be difficult to achieve in practice, in view of constraints and tolerances of manufacture and temperature variations in use of the optical components.

For example, in the case of an optical receiver in which an optical signal is to be coupled from an optical fiber to an optical detector, it is known that the optical signal diverges from the output end of the optical fiber (the total beam angle is $2 \sin^{-1}$ (NA) where NA is the numerical aperture of the fiber; for example NA=0.14 giving a total beam angle of about 16°), so that the optical signal beam width increases with increasing distance from the fiber. It may not be practical to position an optical detector of a given size close enough to the end of the optical fiber to match the beam width; the detector instead may have to be positioned at a greater distance so that it intercepts only a part of the optical signal beam. Thus there is an undesirable mismatch between the detector and the optical signal beam.

It would be desirable to reduce this mismatch, and generally to provide optimal and/or controlled coupling of optical signals in optical components.

In the different field of microactuators, it is known to provide an electrothermal bimorph (a generalization of a bimetal) microactuator to provide relatively large deflection and actuating force due to a change in temperature. An article by Rashidian et al., "Electrothermal Microactuators Based On Dielectric Loss Heating", Proceedings of IEEE MEMS (Micro Electro Mechanical System), pages 24–29, Feb. 1993, discloses such microactuators in which the temperature change is due to heating as a result of dielectric loss due to an applied high frequency alternating (ac) voltage.

In the article by Rashidian et al., the microactuator has the form of a cantilevered beam or a bridge, comprising a polymer layer acting as a dielectric heater between two metal layers to which the alternating voltage is applied, with another underlying polymer layer. The article treats the two polymer layers as forming a bimorph due to different coefficients of thermal expansion.

The article by Rashidian et al. refers to the cantilevered beam or bridge having lengths from tens of microns (micrometers or $\mu$m) to a few millimeters (mm), with specific reference to structures which are in one case 5 mm long and 300 $\mu$m wide, and in another case 3 mm long and 240 $\mu$m wide. The article does not otherwise discuss the width of the cantilevered beam or bridge. It can be appreciated that these microactuators are essentially linear or one-dimensional structures which are supported (by a silicon substrate) only at one end for a cantilevered beam, and only at the two ends for a bridge.

SUMMARY OF THE INVENTION

According to one aspect of this invention there is provided a micro-mirror comprising a membrane supported around its periphery, the membrane comprising first and second metal layers, a first polymer layer forming a dielectric between the first and second metal layers, and a second polymer layer adjacent to the second metal layer with the second metal layer being between the first and second polymer layers, the second metal layer and the second polymer layer having different coefficients of thermal expansion, whereby a high frequency alternating voltage applied between the first and second metal layers produces dielectric loss in the first polymer layer to heat and consequently curve the membrane, at least one of the first and second metal layers thereby forming a curved mirror with a focal length dependent upon said dielectric loss.

In contrast to a microactuator in the form of a one-dimensional cantilevered beam or bridge supported only at one or both ends as described above, the membrane of a micro-mirror in accordance with this aspect of the invention is supported around its periphery, so that it curves in two planes which are perpendicular to one another and to an undisplaced plane of the membrane. In addition, in use of the micro-mirror the displacement of the membrane due to heating does not serve to provide any actuating force, but instead at least one of the metal layers of the membrane acts as a curved mirror to reflect an optical signal beam.

The membrane, which is conveniently square but can alternatively be any other desired shape, can be supported substantially continuously or intermittently around its periphery, conveniently by a substrate with the periphery of the second polymer layer of the membrane adjacent to the substrate.

Such a micro-mirror can be of various sizes, but preferably has a free length of the membrane between its support around its periphery in a range from about 400 $\mu$m to about 1800 $\mu$m.

The micro-mirror can comprise various materials in layers of various thicknesses, but preferably at least one of the first and second metal layers comprises aluminum with a thickness of about 1.5 $\mu$m or less, and at least one of the first and second polymer layers comprises polyvinylidene fluoride. For example, the first polymer layer can comprise a copolymer of polyvinylidene fluoride with a thickness of about 2.5 $\mu$m or less, and the second polymer layer can comprise a homopolymer of polyvinylidene fluoride with a thickness less than about 10 $\mu$m.

Another aspect of the invention provides, in combination, a micro-mirror as recited above and a high frequency alternating voltage source coupled to the first and second metal layers to determine a focal length of the micro-mirror.

A further aspect of the invention provides an optical component comprising a source and sink for an optical signal beam and a micro-mirror as recited above in an optical path between the source and sink for the optical signal beam.

In particular, at least one of the source and sink for the optical signal beam can comprise an optical fiber.

According to another aspect, this invention provides an optical component comprising a source and sink for an optical signal beam and a micro-mirror in an optical path between the source and sink for the optical signal beam, wherein the micro-mirror comprises a membrane arranged to reflect the optical signal beam, the membrane comprising first and second layers of electrically conductive material with a layer of a dielectric material between them, and a further layer, adjacent to the second layer of electrically conductive material, of a material having a different coefficient of thermal expansion from that of the second layer of electrically conductive material, the second layer of electrically conductive material being between said layer of dielectric material and said further layer, the membrane being supported and being such that a high frequency alternating voltage applied between the first and second layers of electrically conductive material produces heating of the layer of dielectric material to heat and consequently curve the membrane.

Preferably the first and second layers of electrically conductive material comprise metal layers at least one of which constitutes a reflective surface of the membrane, and the layer of dielectric material and said further layer comprise polymer layers.

In the above cases, where the optical component is an optical receiver the sink for the optical signal beam comprises an optical signal detector. The invention further extends to a combination of such an optical component, a high frequency alternating voltage source coupled to the first and second metal layers, and a feedback control path from an electrical output of the detector to the high frequency alternating voltage source to control a focal length of the micro-mirror.

BRIEF DESCRIPTION OF THE DRAWINGS

The invention will be further understood from the following description by way of example with reference to the accompanying drawings, which are diagrammatic and not to scale, in which.

DETAILED DESCRIPTION

Figure 1:
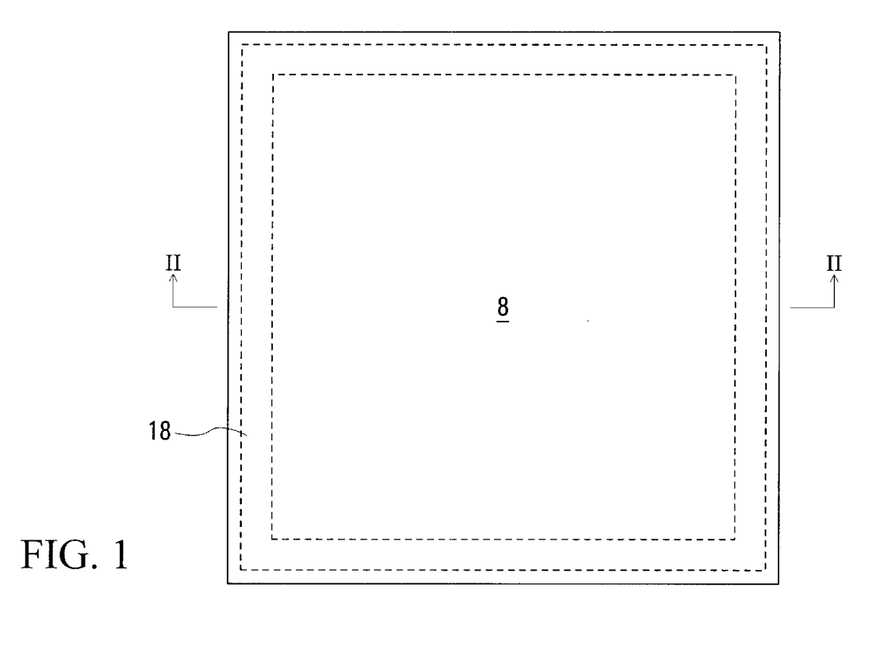
FIG. 1 illustrates a plan view of a micro-mirror in accordance with an embodiment of the invention.
Figure 2:
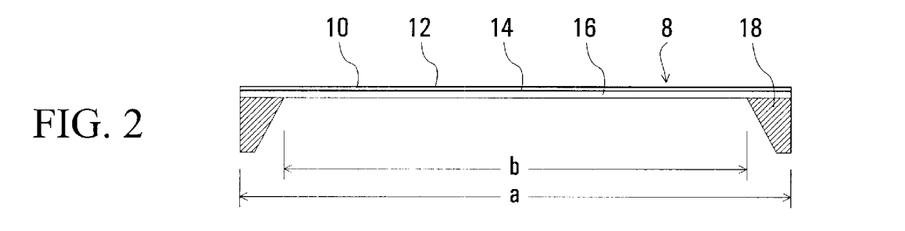
FIG. 2 illustrates a cross-section of the micro-mirror of FIG. 1, the cross-section being taken on the lines II—II of FIG. 1.

Referring to the drawings, a micro-mirror in accordance with an embodiment of the invention is illustrated in a plan view in FIG. 1 and in a sectional view in FIG. 2. As shown in FIG. 2, the micro-mirror comprises a membrane 8 of four layers 10, 12, 14, and 16, and a support 18 which supports the membrane 8 around its periphery. As shown in FIG. 1, the micro-mirror in this case is square, and the support 18 also has a square shape extending continuously around the periphery of the membrane 8. As illustrated in FIG. 2, a parameter 'a' represents a total side length of the membrane 8 and hence of the micro-mirror, and a parameter 'b' represents a free length of the membrane 8 within the support 18.

The membrane layers 10 to 16 comprise a first polymer layer 10 between an upper or first metal layer 12 and a lower or second metal layer 14, on a second polymer layer 16 which is supported by the support 18. In use of the micro-mirror as described below, a high frequency alternating (ac) voltage is applied between the metal layers 12 and 14, and the polymer layer 10 acts as a lossy dielectric to provide heating of the membrane 8. As a result of different coefficients of thermal expansion of the materials of the layers 10 to 16, in particular of the layers 14 and 16, and the support of the membrane 8 around its periphery by the support 18, the heating produces a curvature of the membrane 8.

Light, for example an optical signal, incident upon the upper face of the membrane 8 is reflected by the upper metal layer 12, and can be converged or diverged in accordance with the curvature of the membrane 8. Similarly light, for example an optical signal, incident upon the lower face of the membrane 8 can be passed by the polymer layer 16, referred to as a base polymer layer, and reflected by the lower metal layer 14, being diverged or converged in accordance with the curvature of the membrane 8. The underside of the base polymer layer 16 can potentially be coated with another reflective layer (not shown) to reflect light incident upon the lower face of the membrane 8 without this light being passed by, and possibly attenuated by, the base polymer layer 16.

In each case the curvature of the membrane 8, and hence the divergence or convergence provided by the micro-mirror (effectively, a focal length of the micro-mirror), can be controlled by control of the frequency and/or the magnitude of the ac voltage applied between the metal layers 12 and 14. This curvature also depends upon numerous parameters of the micro-mirror, including the parameters 'a' and 'b' and the thicknesses and materials used for the layers 10 to 16 of the membrane 8.

In general, it may be desired to maximize the deflection and hence the curvature of the membrane 8 (and hence minimize the focal length of the micro-mirror) for any particular size of and power input to the micro-mirror. To this end, it is desirable to provide a large difference between the coefficients of thermal expansion of the base polymer layer 16 and the metal layer 14, which act as a bimorph to produce the curvature of the membrane 8.

As one example, the metal layers 12 and 14 may conveniently be aluminum layers, with the advantages of sufficient electrical conductivity for the applied ac voltage, high reflectivity for incident light (for example for optical signals at wavelengths of the order of 1550 nm), a low coefficient of thermal expansion (about 23 ppm/° C. (parts per million per degree Celsius)), and ease of deposition and etching in integrated circuit production techniques which may be used for manufacture of the micro-mirror. However, it can be appreciated that other materials can be used to constitute the metal layers 12 and 14 (and any additional reflective layer on the underside of the base polymer layer 16 as mentioned above), and that different materials can be used for different ones of these layers.

The base polymer layer 16 desirably has a high coefficient of thermal expansion so that it differs as much as possible from the low coefficient of thermal expansion of the metal (e.g. aluminum) layer 14. The base polymer layer 16 could alternatively be of a material having a very low coefficient of thermal expansion, less than that of the metal layer 14, such as polyimide as disclosed in the article by Rashidian et al. which has a coefficient of thermal expansion of about 3 ppm/° C., but this results in a smaller difference between the respective coefficients of thermal expansion of the bimorph materials and hence less curvature (the direction of the deflection typically being relatively opposite to that described here) for a given heating of the membrane 8.

To this end, by way of example the base polymer layer 16 can conveniently comprise a fluorinated thermoplastic homopolymer, PVDF (polyvinylidene fluoride), such as Kynar (Trade Mark) PVDF available from Atofina Chemicals, Inc., which has a coefficient of thermal expansion of the order of 150 ppm/° C.

The dielectric polymer layer 10 desirably has a high dielectric loss factor for maximum heating from the supplied ac voltage, and a Young's modulus which is less than or equal to that of the adjacent metal layers 12 and 14, to provide optimum bimorph characteristics. This layer 10 desirably also has a coefficient of thermal expansion which is similar to that of the metal layers 12 and 14 between which it is sandwiched, in order to minimize stresses in the dielectric polymer layer 10, but it can have a substantially different coefficient of thermal expansion from that of the metal layers. Contrary to the teaching of the article by Rashidian et al., it has been found that the dielectric polymer layer 10 is not required to have a high coefficient of thermal expansion.

To these ends, by way of example the dielectric polymer layer 10 can conveniently comprise a fluorinated thermoplastic copolymer, such as Kynar (Trade Mark) Flex (Trade Mark) PVDF available from Atofina Chemicals, Inc., which has a high coefficient of thermal expansion but has advantages in that it can be spun down to a layer thickness of 1 $\mu$m or less and can be easily etched.

It can be appreciated that these materials are referred to by way of example only, and that other suitable materials may alternatively be used for the respective layers of the membrane 8.

In order to produce a micro-mirror as described above, the layers 16, 14, 10, and 12 of the membrane 8 can be formed successively, each in a manner well known in the art of integrated circuit manufacture, on top of one another each with a desired thickness of its respective material, on a substrate of a suitable material, such as silicon, gallium arsenide, indium phosphide, silicon glass, sapphire, aluminum nitride, etc. The substrate can then be back-etched in known manner to release the membrane 8 from the remaining substrate material, forming the support 18, over the free length 'b' of the membrane 8. A plurality of micro-mirrors can be produced simultaneously on the same substrate in this manner.

Figure 3:
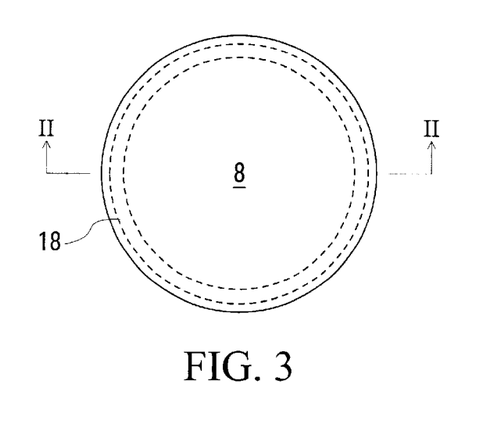
FIGS. 3 and 4 illustrate plan views of micro-mirrors in accordance with alternative embodiments of the invention, each having the same cross-section as that shown in FIG. 2 taken on the lines II—II in each of FIGS. 3 and 4.

Although as described above and illustrated in FIG. 1 the micro-mirror is square, this need not be the case and the micro-mirror can be rectangular, polygonal, elliptical, circular, or can have any other desired shape. For example, FIG. 3 illustrates an alternative plan view, having the same cross-section as shown in FIG. 2, of a micro-mirror which is circular. It can be appreciated that where the micro-mirror has different length and width dimensions (e.g. it is rectangular), the curvature of the membrane 8, and the focal length of the mirror, will be different for different perpendicular directions.

Figure 4:
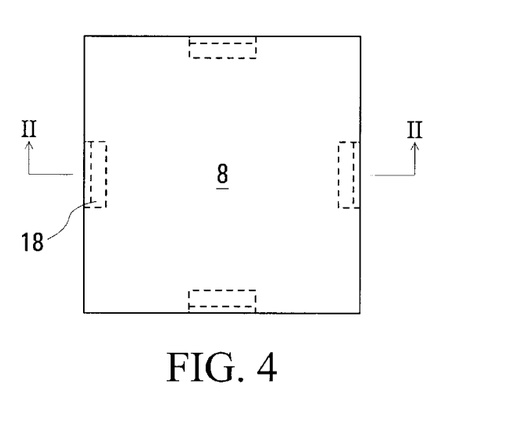

In addition, although as described and illustrated in FIGS. 1 and 3 above the support 18 extends continuously around the periphery of the micro-mirror, this need not be the case and the support 18 can instead support the membrane 8 at interrupted, intermittent, or discontinuous points around its periphery. For example, FIG. 4 illustrates an alternative plan view, having the same cross-section as shown in FIG. 2, of a square micro-mirror in which the support 18 extends over only a small part the periphery on each side of the square.

It can be appreciated from the description above that, when an ac voltage is applied between the metal layers 12 and 14 of the micro-mirror, dielectric loss in the dielectric polymer layer 10 produces heating of the membrane 8, and the different coefficients of thermal expansion of the base polymer layer 16 and the metal layer 14 result in a curved displacement of the membrane 8 up or down from its undisplaced position shown in FIG. 2.

Figure 5:
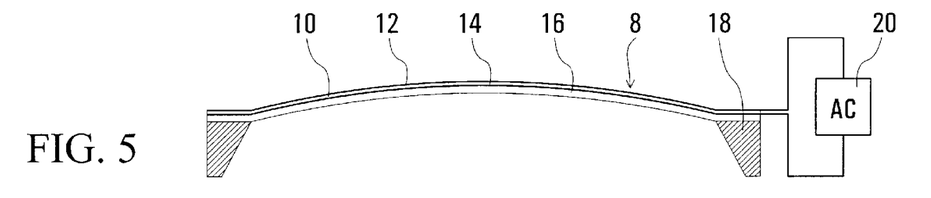
FIGS. 5 and 6 illustrate in cross-section two alternative forms of micro-mirror in accordance with embodiments of the invention, in each case with an alternating voltage applied.
Figure 6:
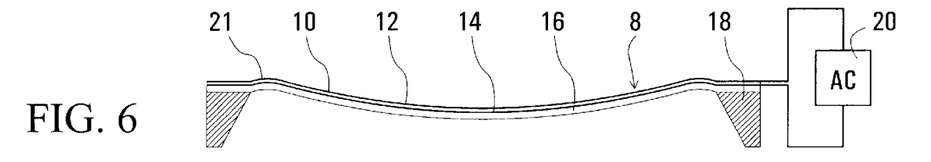

This is illustrated in FIGS. 5 and 6, in each of which an ac voltage source 20 is illustrated as being connected to the metal layers 12 and 14. By way of example, the ac source 20 may provide an alternating voltage of the order of 5 to 12 volts at a frequency of the order of 30 to 100 MHz, and either the voltage or the frequency, or both, may be varied to vary the curvature of the membrane 8, and hence the focal length of the micro-mirror.

FIG. 5 illustrates the curved displacement of the membrane 8 as being up from its undisplaced position, so that the metal layer 12 provides a convex reflecting surface and the underside of the membrane 8 is concave. Conversely, FIG. 6 illustrates the curved displacement of the membrane 8 as being down from its undisplaced position, except for a small lip 21 with an upward displacement around the periphery of the membrane 8 adjacent the support 18, so that the metal layer 12 provides a generally concave reflecting surface and the underside of the membrane 8 is generally convex.

Either the displacement of FIG. 5 or that of FIG. 6 can occur, depending on the parameters of the micro-mirror and, in particular, an aspect ratio of the membrane 8, this aspect ratio being a ratio of the free length 'b' of the membrane 8 to the thickness of the membrane 8 (i.e. the total thickness of the layers 10 to 16). For dimensions of a micro-mirror as described further below, this aspect ratio is very high, and the curvature of the membrane 8 is as shown in FIG. 6. For much smaller aspect ratios the curvature of the membrane 8 is as shown in FIG. 5. A numerical analysis of the membrane 8 can be used to determine the direction and extent of curvature of any particular micro-mirror.

Figure 7:
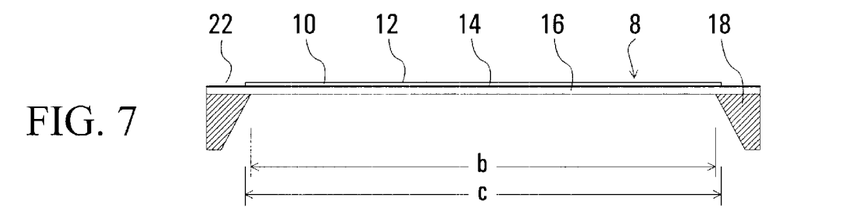
FIG. 7 illustrates a cross-section, similar to FIG. 2, of another form of micro-mirror in accordance with an embodiment of the invention.

As described below it is desirable, for reducing the focal length of the micro-mirror, for an overlap of the membrane 8 to be small. This overlap, representing an extent to which the membrane 8 extends over the support 18, is equal to (a−b)/b for the illustration in FIG. 2. FIG. 7, which is a cross-section similar to FIG. 2, illustrates a modified form of micro-mirror in which upper layers 10 and 12 of the membrane 8 are removed in a region 22 overlying much of the support 18. The metal layer 14 can also be removed from this region, but is shown in FIG. 7 as being present in this region because it can be used as a mask for etching of the base polymer layer 16.

This modified form of the micro-mirror of FIG. 7 effectively reduces the overlap to a very small value, equal to (c−b)/b where c is the dimension of the layers 10 and 12 as shown in FIG. 7, while maintaining adhesion of the base polymer layer 16 to the support 18.

Figure 8:
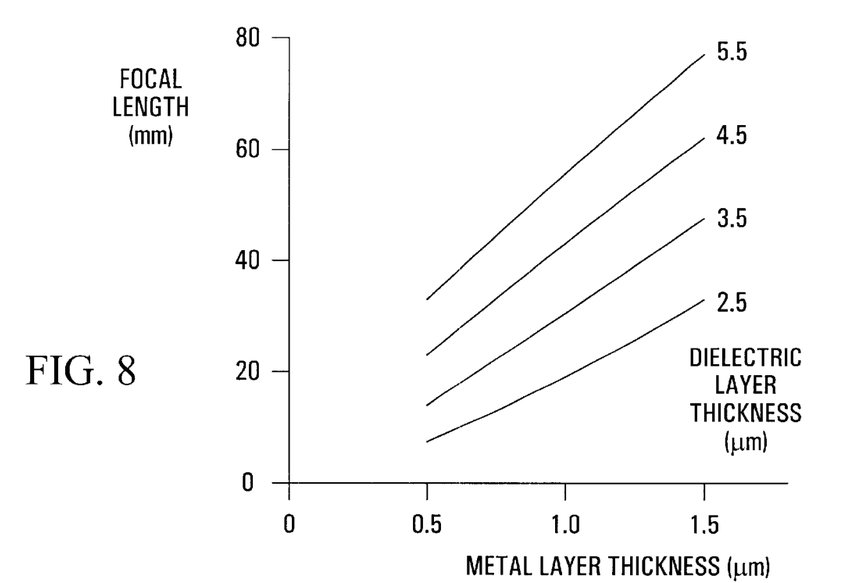
FIGS. 8 to 11 are graphs, derived using finite element simulation, illustrating variation of focal length of a model of a micro-mirror in accordance with an embodiment of the invention with parameters of the micro-mirror.
Figure 9:
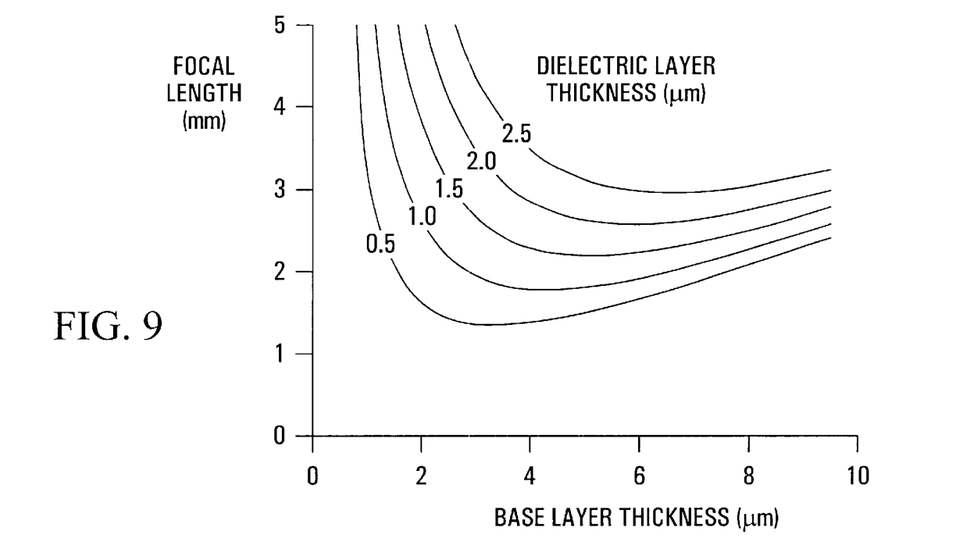

FIGS. 8 to 11 are graphs, derived using finite element simulation, illustrating variation of focal length of a model of a micro-mirror as described above with various parameters of the micro-mirror and using the materials referred to above by way of example. The model is an axisymmetric model (i.e. it represents a rotationally symmetric circular micro-mirror as illustrated in FIG. 3 rather than the square micro-mirror of FIG. 1) but comparisons with a quarter-solid model (a model based on one of the four quadrants of the square micro-mirror of FIG. 1) indicate that the models have similar trends and the different models indicate similar optimal values, in particular for the thickness of the base polymer layer 16 as illustrated in FIG. 9.

FIG. 8 illustrates focal length of a micro-mirror as a function of thickness up to about 1.5 $\mu$m of the metal layers 12 and 14 (assumed here to be both the same), for various thicknesses of the dielectric polymer layer 10. As indicated by this graph, reduced focal length is provided by relatively thin metal layers which have relatively reduced stiffness. A thickness of 0.5 $\mu$m for each of the metal layers 12 and 14 is selected for the determinations below, but thinner metal layers could be used provided that they are sufficiently electrically conductive for the electrical field required for dielectric heating. FIG. 8 also illustrates that a relatively thin dielectric polymer layer 10 is desirable to provide a small focal length.

FIG. 9 illustrates focal length of a micro-mirror as a function of thickness, up to about 10 $\mu$m, of the base polymer layer 16, for various thicknesses, up to 2.5 $\mu$m, of the dielectric polymer layer 10. As indicated by this graph, there is an optimal base layer thickness, for providing a minimum focal length, in relation to thicknesses of the other layers of the membrane 8.

For example, with a thickness of 0.5 $\mu$m as indicated above for each of the metal layers 12 and 14, and a thickness of 1.0 $\mu$m for the dielectric polymer layer 10, as indicated in FIG. 9 a base layer thickness of about 4.5 $\mu$m provides a minimum focal length of the micro-mirror. A thinner dielectric polymer layer 10 (e.g. 0.5 $\mu$m).may be desirable as indicated in FIG. 9, with a consequently thinner base polymer layer (about 3 $\mu$m) to provide a reduced focal length, but may be more difficult to achieve in a manufacturing process.

It can be appreciated that, for example with the thickness of the polymer layers 10 and 16 being 1.0 and 4.5 $\mu$m respectively, the total membrane thickness is 6.5 $\mu$m. If for example a=1800 $\mu$m and b=1680 $\mu$m, then it can be seen that the aspect ratio referred to above is more than 250:1. With such a high aspect ratio, the membrane displacement has the form shown in FIG. 6 rather than the form shown in FIG. 5.

Figure 10:
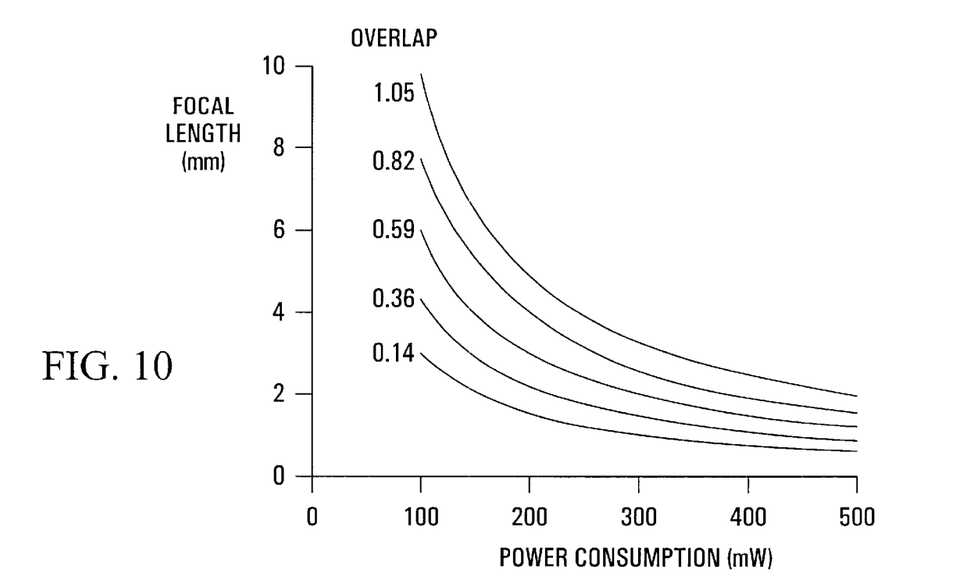

FIG. 10 illustrates focal length of a micro-mirror as a function of power consumption from the ac source 20, for various values of the overlap referred to above, and for a value of b=880 $\mu$m. As indicated by this graph, for all power consumptions the focal length is reduced with smaller values of the overlap.

Figure 11:
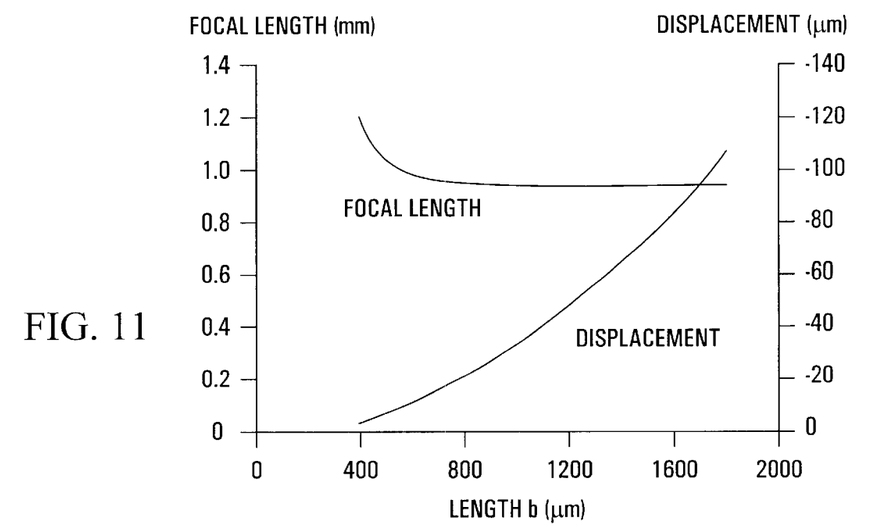

FIG. 11 illustrates focal length and displacement of a micro-mirror as a function of the free length parameter 'b' of the membrane 8 in a range from about 400 to about 1800 $\mu$m. The displacement is that of the center of the membrane 8 relative to its undisplaced position shown in FIGS. 2 and 7, and is negative corresponding to a curvature of the membrane 8 down as shown in FIG. 6. FIG. 11 represents characteristics for a membrane thickness of 6.5 $\mu$n as described above, and a constant overlap of 0.1. For smaller sizes (e.g. b<200 $\mu$m) the displacement becomes positive (i.e. the membrane curvature is up as shown in FIG. 5).

As shown by FIG. 11, with increasing size above about b=1000 $\mu$m the magnitude of the displacement continues to increase but the focal length of the micro-mirror is substantially constant. However, for a given maximum temperature, a larger membrane size enables a greater power consumption, and hence a smaller focal length. This is shown by the following table indicating relative values of maximum power consumption, maximum displacement, and minimum focal length for a square micro-mirror with various values of the parameter 'b':

| b ($\mu$m) | Max. Power (mW) | Max. Displ. ($\mu$m) | Min. Focal Length (mm) |
|---|---|---|---|
| 1000 | 210 | −23 | 1.3 |
| 1200 | 230 | −37 | 1.2 |
| 1400 | 250 | −54 | 1.1 |
| 1600 | 260 | −75 | 1.1 |
| 1800 | 270 | −98 | 1.0 |

A micro-mirror as described above can be used in any of a wide variety of optical components, for example in any situation in which it may be useful, desirable, or necessary to focus, spread, and/or change the position and/or direction of an optical signal. Uses of a micro-mirror as described above in an optical receiver and a variable optical attenuator are given below, but it should be appreciated that these are only by way of example and not limitation.

Figure 12:
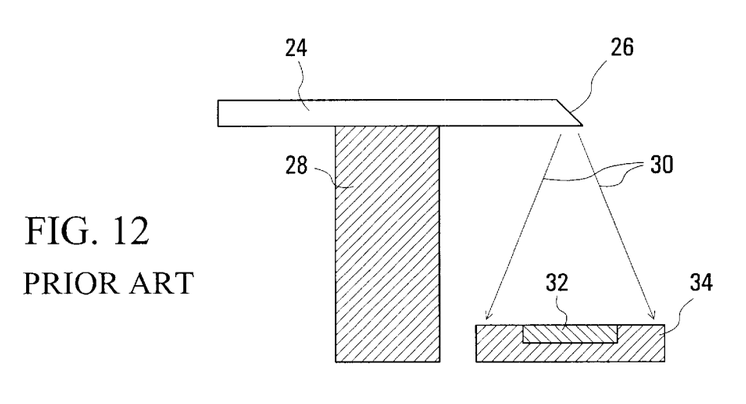
FIG. 12 illustrates a known form of optical receiver.

Referring to FIG. 12, a known form of optical receiver illustrated as comprising an optical fiber 24 having an end 26 which is angled to reflect downwardly an optical signal incoming via the fiber 24, which is mounted on a support 28. The optical signal reflected at the fiber end 26 diverges from the fiber within a divergence angle related to the NA of the fiber as described above, as indicated by divergent arrows 30. The divergent optical signal is incident upon an optical detector 32 having a support 34, the detector 32 providing an electrical output signal (not shown) corresponding to the optical signal.

As illustrated in FIG. 12, the detector has an appreciably smaller size than the width of the divergent optical signal beam at the detector, so that a relatively small part of the optical signal is received by the detector; thus there is a mismatch between the areas of the optical signal beam and the detector. While such a mismatch can potentially be avoided by moving the detector closer to the fiber end 26, increasing the size of the detector 32, and/or decreasing the NA of the fiber 24, none of these may be practical.

Figure 13:
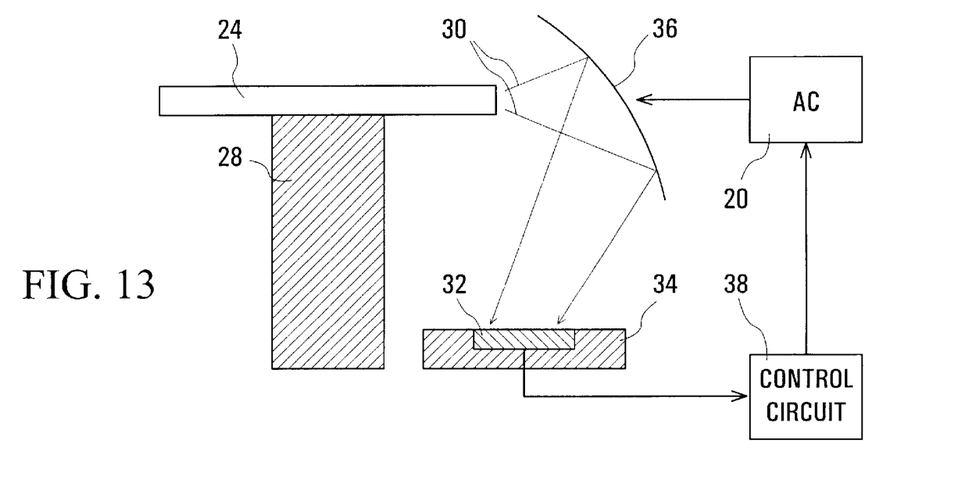
FIGS. 13 and 14 illustrate an optical receiver including a micro-mirror and a feedback control loop in accordance with further embodiments of the invention.

FIG. 13 illustrates an optical receiver including a micro-mirror 36 as described above, which enables the mis-match described above to be avoided. FIG. 13 also illustrates an optional control circuit 38 in a feedback control loop for controlling the focal length of the micro-mirror.

Referring to FIG. 13, the fiber 24 and its support 28, and the detector 32 and its support 34, are provided in the same manner as in FIG. 12, except that in this case the end of the fiber 24 is not angled so that the optical signal beam diverges directly from the end of the fiber 24, with the same angle of divergence represented by arrowed lines 30. In the optical receiver of FIG. 13, however, the optical signal beam is reflected by the concave face of the micro-mirror 36, whose focal length is determined by the characteristics of the micro-mirror and by the voltage and frequency of an ac voltage applied to it from the ac source 20, also shown in FIG. 13. This focal length is determined, and the micro-mirror 36 is positioned, so that as shown in FIG. 13 the optical signal beam is focussed and directed fully onto the detector 32, thereby matching the optical beam size to the detector and maximizing the electrical output signal from the detector.

The optional control circuit 38 in FIG. 13 is responsive to the electrical output of the detector 32 to provide a feedback control signal to the ac source 20 to control its voltage and/or frequency, and thereby to control the focal length of the micro-mirror 36, in a manner to provide and maintain a maximum amplitude of the output signal of the detector. The control circuit 38 can use any of many known feedback control techniques to provide a desired feedback control signal to the ac source 20.

Figure 14:
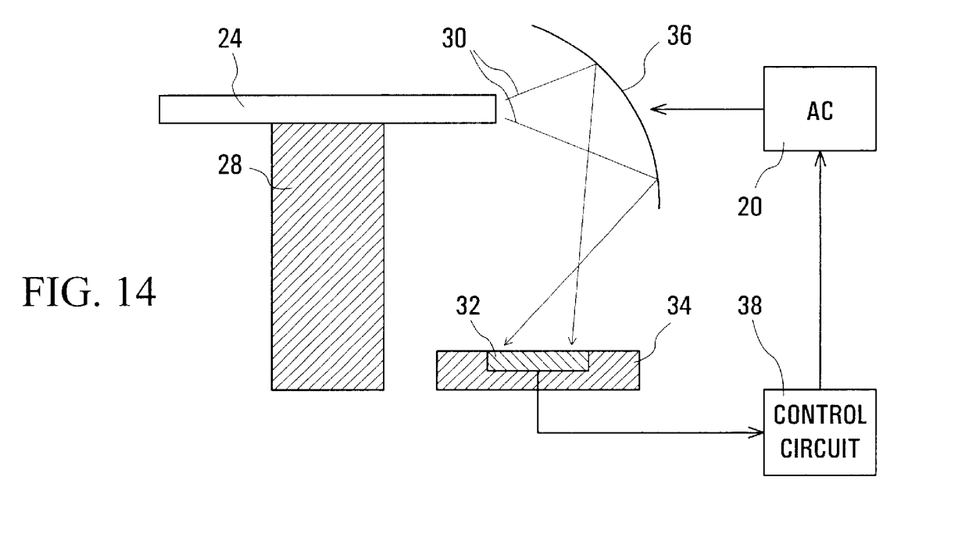

Such a feedback control loop provided via the control circuit 38 can not only provide compensation for example for tolerances of elements of the optical receiver but can also compensate for variations in temperature. For example, FIG. 14 illustrates the optical receiver with the same components as FIG. 13, but with the fiber 24 raised and the detector 32 shifted relatively to the right due to temperature changes or other variations. In this case the control circuit 38 controls the ac source 20 so that the micro-mirror 36 has a considerably reduced focal length, corresponding to a greater curvature as shown in FIG. 14. In this case as shown by the arrows 30 the optical signal beam is focussed before reaching the detector 32, and although it is diverging on reaching the detector 32 it is still within the area of the detector for a maximum electrical output signal from the detector.

Figure 15:
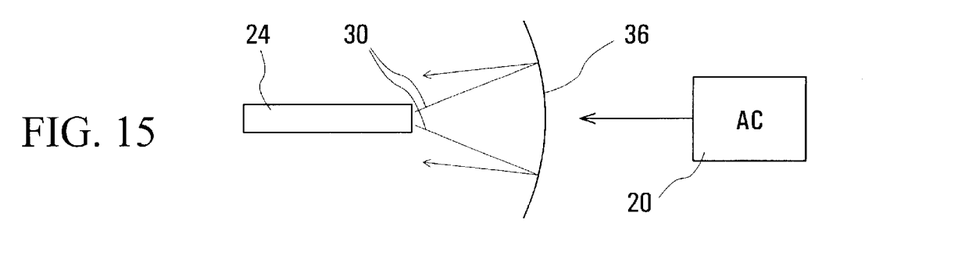
FIG. 15 illustrates a variable optical attenuator including a micro-mirror in accordance with another embodiment of the invention.

FIG. 15 illustrates an example of a variable optical attenuator (VOA) including a micro-mirror 36 as described above. In FIG. 15, a fiber 24 serves as both a source of an optical signal to be attenuated and, in the opposite direction, an output for the attenuated optical signal. The micro-mirror 36 is arranged opposite an end of the fiber 24 from which the optical signal beam diverges at an angle related to the NA of the fiber 24 as described above, as again shown by arrows 30. As also shown by the arrows 30, the optical signal beam 30 is reflected by the micro-mirror 36, the reflected beam converging or diverging in accordance with the focal length of the micro-mirror, which is controlled as described above by controlling the voltage and/or frequency supplied to the micro-mirror from the ac source 20. A part of the optical signal beam reflected by the micro-mirror 36 re-enters the fiber 24 and is propagated back (i.e. in a direction from right to left in FIG. 15) along the fiber 24 as an attenuated optical signal.

It can be appreciated that the focal length of the micro-mirror 36 in the VOA of FIG. 15 can be varied by control of the ac source 20 so that the reflected optical signal beam has a desired angle of convergence or divergence, so that a desired greater or lesser portion of the optical signal beam re-enters the fiber 24, whereby the attenuation of the VOA is varied.

Although as illustrated in FIG. 15 and described above the reflected optical signal beam is reflected by the micro-mirror 36 back to the same fiber 24 via which it is supplied, this need not be the case and instead the optical signal beam may be similarly reflected by the micro-mirror 36 onto a different optical fiber, or onto a plurality of optical fibers to provide an attenuating optical signal splitter.

Although as described above and as illustrated in FIGS. 2 and 5 to 7 the micro-mirror has the base polymer layer 16 supported around the periphery of the membrane 8 by the support 18, the membrane 8 can instead be inverted from this position so that the polymer layer 16 is uppermost and the metal layer 12 is adjacent to the support 18.

Although particular examples of applications of the micro-mirror are given above, it can be appreciated that micro-mirrors in accordance with embodiments of the invention can be used in other applications, for example for compensating for changes in material dimensions or for polarization mode dispersion compensation.

Thus although particular embodiments of the invention and variations have been described above in detail, it can be appreciated that these and numerous other modifications, variations, and adaptations may be made, and other applications of the micro-mirror may be provided, without departing from the scope of the invention as defined in the claims.

What is claimed is:

1. A micro-mirror comprising a membrane supported around its periphery, the membrane comprising first and second metal layers, a first polymer layer forming a dielectric between the first and second metal layers, and a second polymer layer adjacent to the second metal layer with the second metal layer being between the first and second polymer layers, the second metal layer and the second polymer layer having different coefficients of thermal expansion, whereby a high frequency alternating voltage applied between the first and second metal layers produces dielectric loss in the first polymer layer to heat and consequently curve the membrane, at least one of the first and second metal layers thereby forming a curved mirror with a focal length dependent upon said dielectric loss.

2. A micro-mirror as claimed in claim 1 wherein the membrane is supported substantially continuously around its periphery.

3. A micro-mirror as claimed in claim 1 wherein the membrane is supported around its periphery by a substrate.

4. A micro-mirror as claimed in claim 3 wherein the periphery of the second polymer layer of the membrane is adjacent to the substrate.

5. A micro-mirror as claimed in claim 1 wherein the membrane is substantially square.

6. A micro-mirror as claimed in claim 1 wherein a free length of the membrane between its support around its periphery is in a range from about 400 $\mu$m to about 1800 $\mu$m.

7. A micro-mirror as claimed in claim 1 wherein at least one of the first and second metal layers comprises aluminum.

8. A micro-mirror as claimed in claim 1 wherein a thickness of each of the first and second metal layers is about 1.5 $\mu$m or less.

9. A micro-mirror as claimed in claim 1 wherein at least one of the first and second polymer layers comprises polyvinylidene fluoride.

10. A micro-mirror as claimed in claim 9 wherein the first polymer layer comprises a copolymer of polyvinylidene fluoride.

11. A micro-mirror as claimed in claim 10 wherein the second polymer layer comprises a homopolymer of polyvinylidene fluoride.

12. A micro-mirror as claimed in claim 1 wherein a thickness of the first polymer layer is about 2.5 $\mu$m or less.

13. A micro-mirror as claimed in claim 1 wherein a thickness of the second polymer layer is less than about 10 $\mu$m.

14. In combination, a micro-mirror as claimed in claim 1 and a high frequency alternating voltage source coupled to the first and second metal layers to determine a focal length of the micro-mirror.

15. An optical component comprising a source and sink for an optical signal beam and a micro-mirror as claimed in claim 1 in an optical path between the source and sink for the optical signal beam.

16. An optical component as claimed in claim 15 wherein at least one of the source and sink for the optical signal beam comprises an optical fiber.

17. An optical component as claimed in claim 15 wherein the sink for the optical signal beam comprises an optical signal detector.

18. In combination, an optical component as claimed in claim 17, a high frequency alternating voltage source coupled to the first and second metal layers, and a feedback control path from an electrical output of the detector to the high frequency alternating voltage source to control a focal length of the micro-mirror.

* * * * *